Patented Jan. 3, 1933

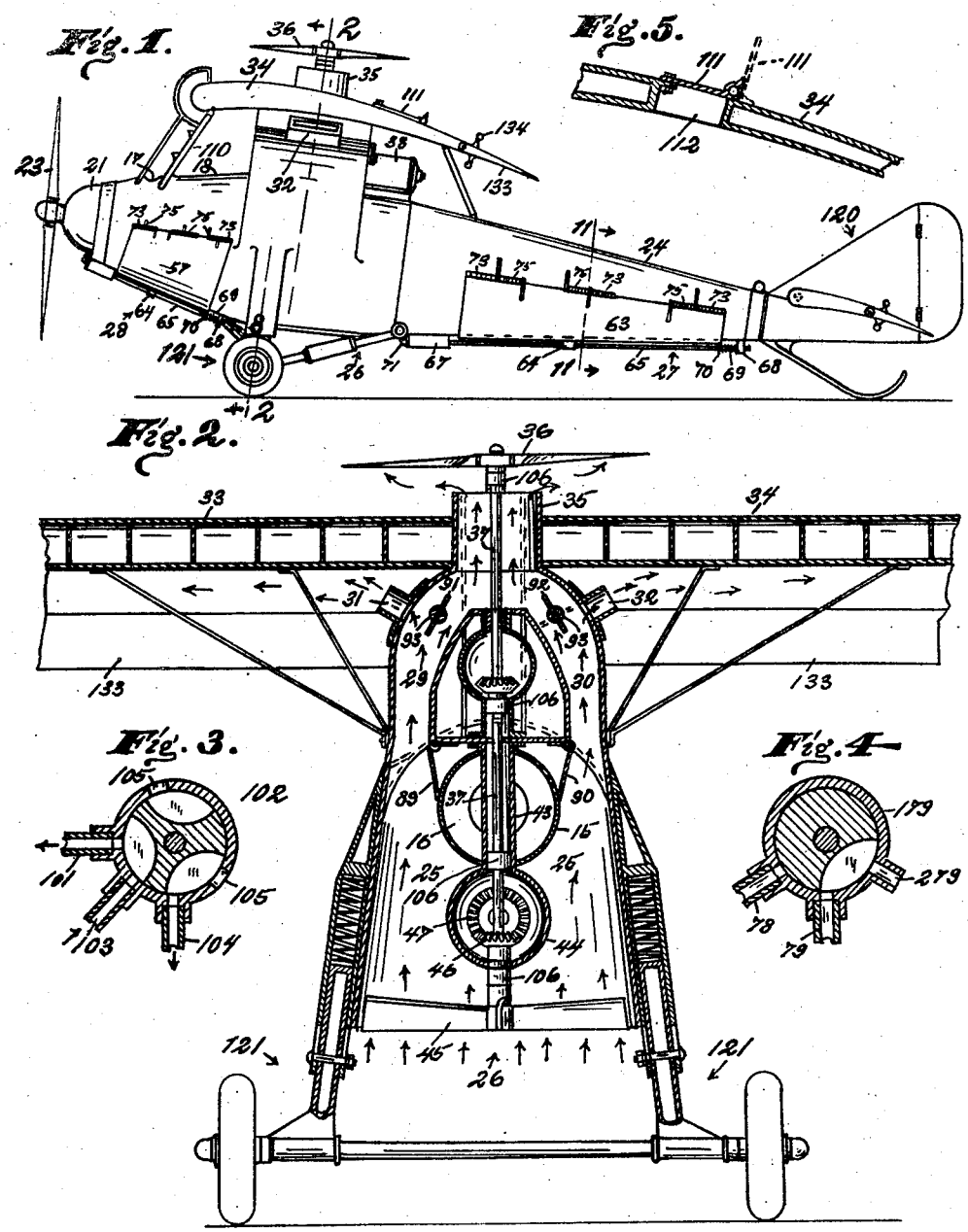

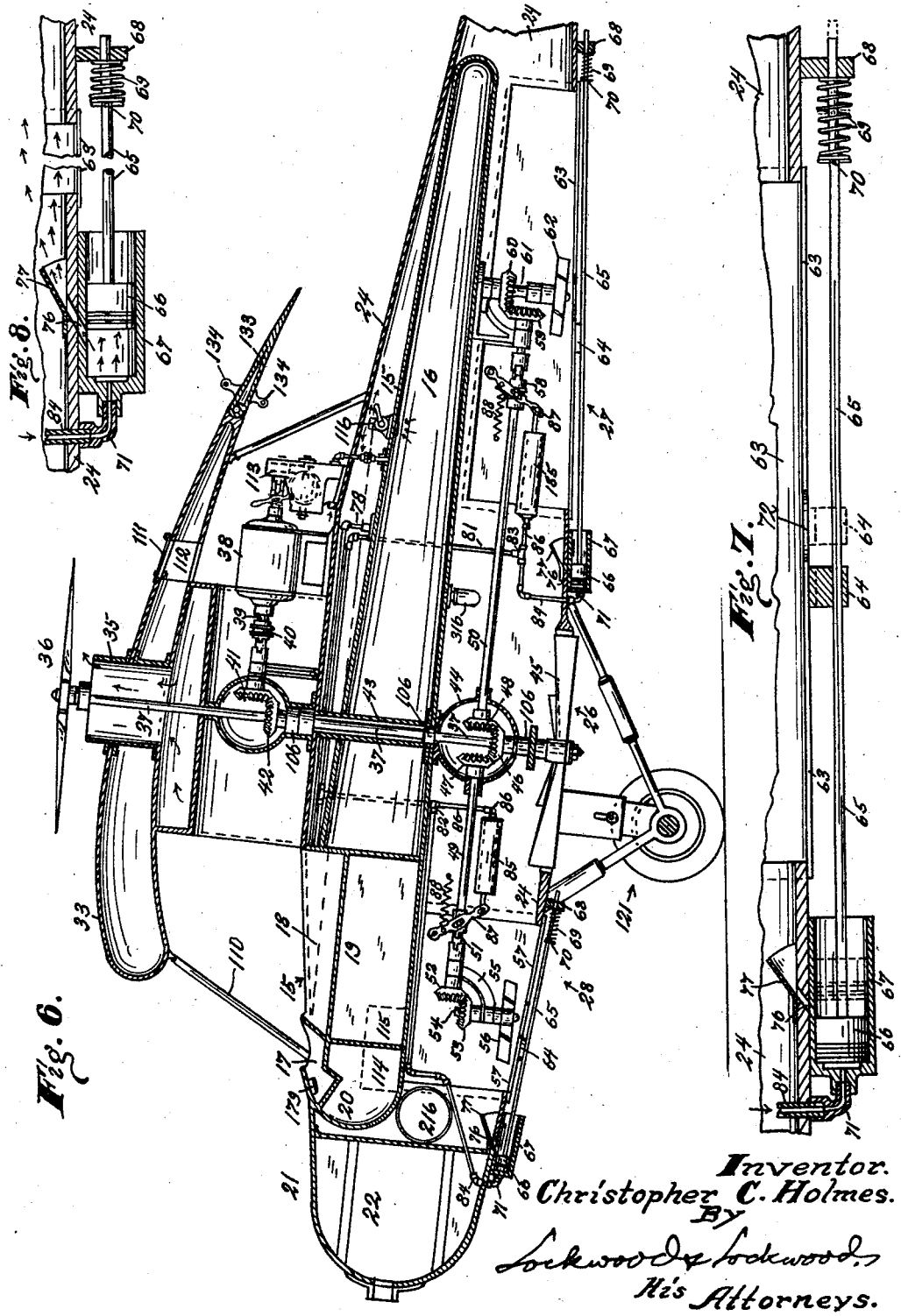

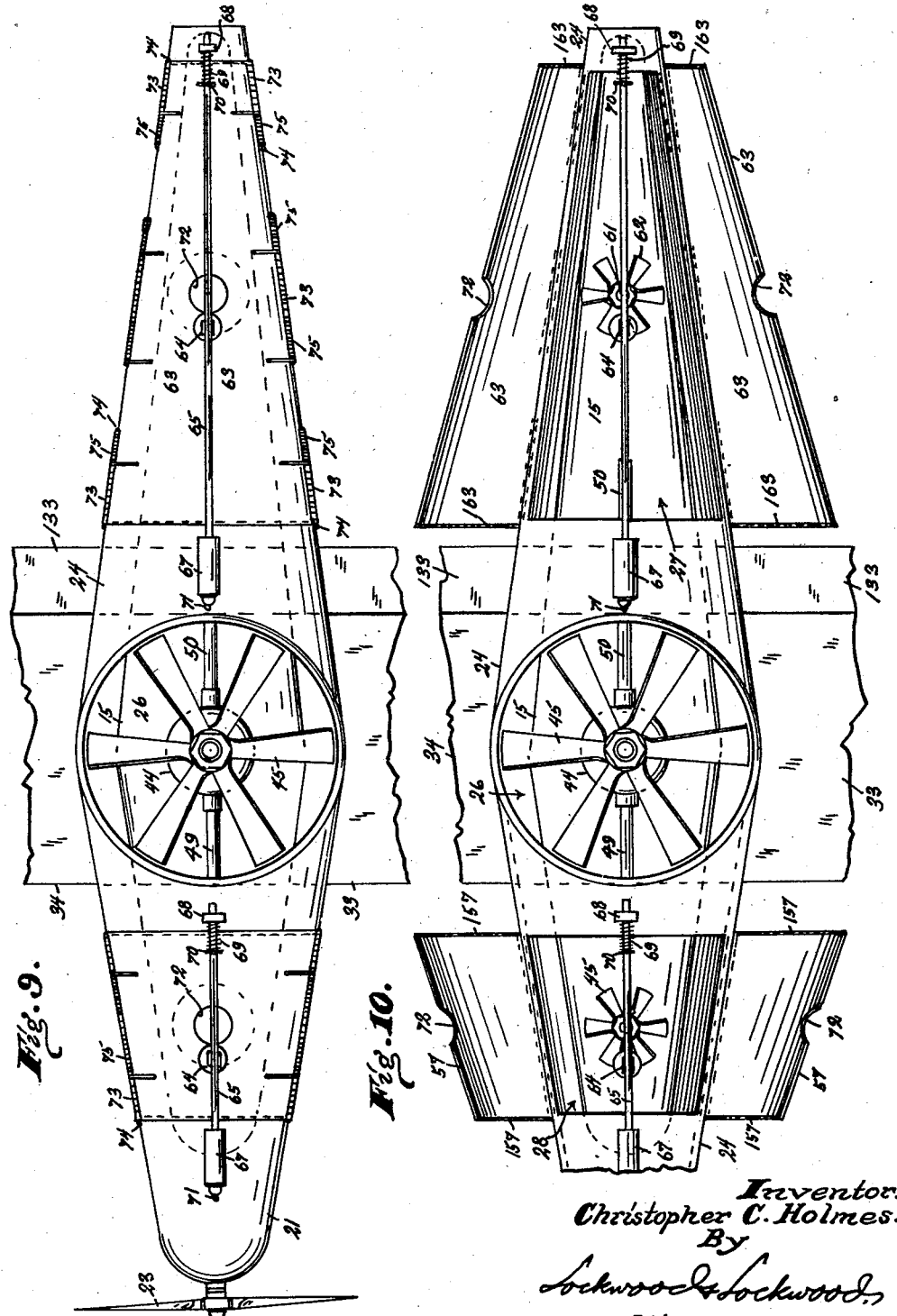

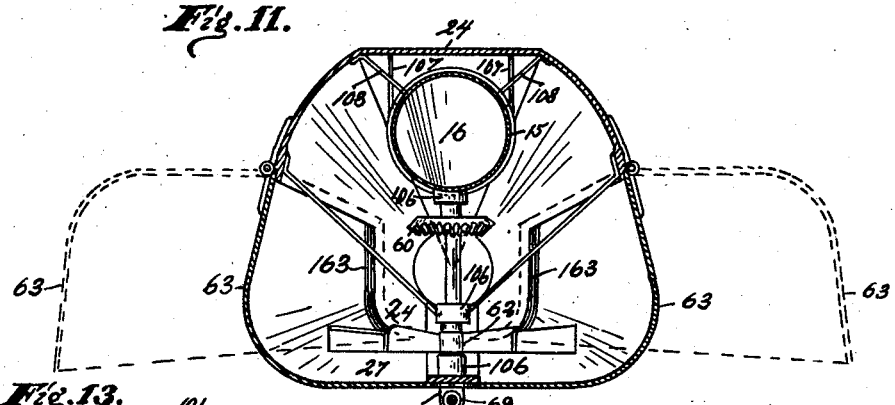
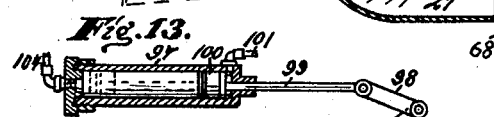
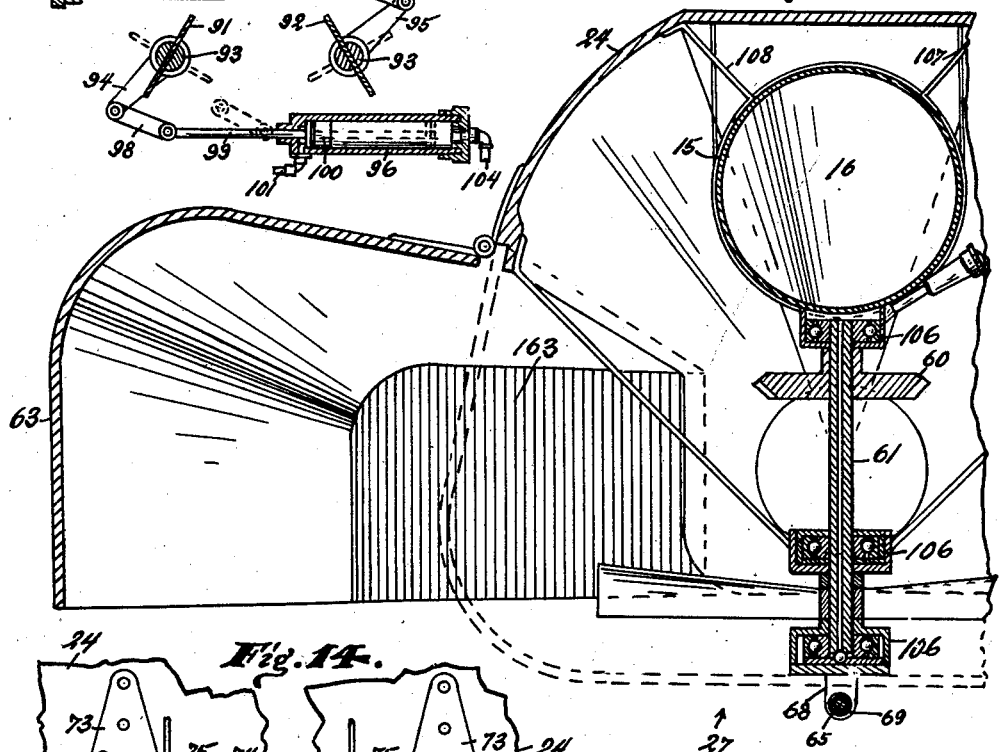
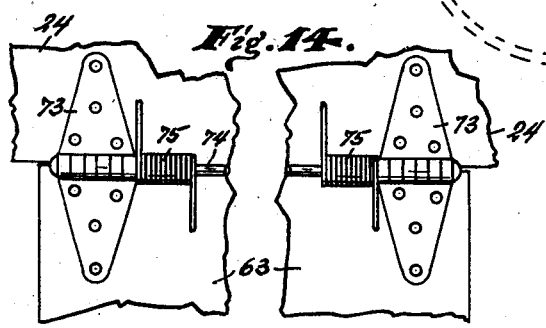
Inventor,
Christopher C. Holmes.
By
Lockwood & Lockwood,
His Attorneys.

1,892,949

UNITED STATES PATENT OFFICE

CHRISTOPHER C. HOLMES, OF LOS ANGELES, CALIFORNIA

HELICOPTER-AIRCRAFT

Application filed November 17, 1931. Serial No. 575,508.

This invention relates to an improvement in the construction of aircrafts and the principal object is to provide a helicopter-aircraft that in flight can be quickly converted into the form of a parachute to resist gravity in falling, and to that end I provide a body enclosed in a shell forming a relatively large air chamber around the body with pairs of wings at the front and rear of the shell that are normally folded under it to close air passages into the shell; and also I provide means for opening the wings when necessary. In other words, when the wings are opened they spread out over a large area and are formed to divert the air inwardly so it passes up around the body and out through discharge openings under the fixed wings of the aircraft; and in this connection I provide means for controlling the air discharging under the fixed wings to stabilize them.

A feature of invention is shown in the means for driving a volume of air up through the shell and out under the fixed wings of the aircraft and of displacing the air above the fixed wings to aid in stabilizing and moving the aircraft vertically in flight. To that end I provide a relatively large air inlet in the bottom of the shell and rotate a fan therein to drive air through the shell and out of discharge outlets through spouts at the top of the shell and under the fixed wings thereof and also drive a helicopter propeller above the fixed wings to move the aircraft vertically and aid in stabilizing it as stated.

Another object of the invention is to provide means for discharging a large volume of compressed air into a chamber within the aircraft that is utilized to support it in the event it enters a field or pocket of rarefied air while in flight, and also this large volume of compressed air can be released at the start of the flight to aid the aircraft in ascending from the ground.

Another feature of invention is shown in the construction and operation of the means for releasing the folded wings and setting propellers in operation in the air passages covered by the wings to drive air into the shell of the aircraft for stabilizing the aircraft, and also the wings are spread in the form of a parachute to aid the aircraft in descending in a gentle manner.

Another feature of invention is shown in the construction and arrangement of parts for controlling the discharge of air from the air chamber around the body whereby either, all or part of the air, can be discharged under one or the other of the fixed wings or equalized between them.

A feature of invention is shown in the construction of the cylinders for releasing the folding wings, whereby they not only release the wings so they can be opened, but they also discharge compressed air into the shell to aid in forcing the wings to an open position after they have released them.

Other objects, advantages and features of invention may appear from the accompanying drawings, the subjoined detailed description and the appended claims.

The accompanying drawings illustrate the invention, in which:

Fig. 1 is a side view of a helicopter aircraft constructed in accordance with this invention showing it ready to take to flight with the wings folded.

Fig. 2 is an enlarged fragmental section on staggered line 2—2 of Fig. 1, showing the passage of driven air through the shell and out under the fixed wings; and also showing part of the air discharging above the wings and under the helicopter propeller.

Fig. 3 is a cross section through one of the valves for controlling the air cylinders.

Fig. 4 is another cross section through another type of valve for controlling the air cylinders.

Fig. 5 is a fragmental central section through a portion of the stationary wings of the aircraft showing a trap-door normally closing a man-hole through the fixed wings.

Fig. 6 is a fragmental central longitudinal section through the aircraft with many of the parts indicated diagrammatically and parts omitted for the sake of clearness in the drawings, showing the means for releasing the folded wings, and also engaging clutches so the fan-propellers in the wing closed air passages will be actuated when the wings are released.

Fig. 7 is a fragmental sectional view through one of the air cylinders for releasing the folded wings of the aircraft and discharging compressed air to aid in opening the folded wings when they are released.

Fig. 8 is a view analogous to Fig. 7 with the piston in the cylinder moved to a position where compressed air will discharge into the aircraft shell to aid in opening the folded wings when they are released.

Fig. 9 is a view of the underside of the aircraft looking upward parts omitted showing the folded wings in closed position and also showing an end view of the shaft on which the helicopter propellers are mounted, it being understood that there is a propeller under and another above the aircraft.

Fig. 10 is a view analogous to Fig. 9 with the folded wings in open position and showing end views of the normally idle propellers that are actuated when the wings are opened.

Fig. 11 is a cross section on line 11—11 of Fig. 1, showing the wings in closed position and indicating their open position by dotted lines.

Fig. 12 is an enlarged fragmentary view analogous to the left hand portion of Fig. 11, showing one of the wings in open position and also showing the detailed mounting of the propeller shaft on which one of the idle propellers is mounted.

Fig. 13 is a semidiagrammatic sectional view showing the means for controlling the passage of the air from the aircraft shell to the underside of the stationary wings, parts omitted for the sake of clearness in the drawings.

Fig. 14 is a fragmental view of the helicopter shell with one of the wings pivotally connected thereto showing the springs for automatically returning the wings to a closed position after air pressure thereon is released.

The aircraft includes a body 15 having an air compartment 16 therein and also at the forward end having a cock-pit 17, passenger compartment 18, sleeping quarters 19 and storage compartment 20, and secured to the front end of the body 15 is a housing 21 for the engine 22 that is diagrammatically indicated in Fig. 6, it being understood that this engine is in driving connection with the propeller 23 shown in Figs. 2 and 9. The engine 22 and propeller 23 can be of any suitable type and operatively connected with the cock-pit 17 by means well understood in the art. The engine 22 and propeller 23 are for horizontal locomotion of the aircraft after it is in flight, it being understood that they also aid in starting and landing the apparatus.

The body 15 is enclosed by a shell 24 to form an air chamber 25 entirely around it, and extending through the bottom of the shell are air passages 26, 27 and 28 through which air can be driven to pass upwardly around the body 15 and through the split air passages 29 and 30. The split passages 29—30 are arranged to discharge air through the spouts 31 and 32 under the fixed wings 33 and 34 of the aircraft to stabilize it. Also the passages 29 and 30 converge again in the discharge spout 35 that extends up between wings 33 and 34 so that it discharges under the top helicopter propeller 36 that is secured on the upper end of the shaft 37 driven by the motor 38.

The driving connection between the motor 38 and shaft 37 includes the shaft 39 on which there is a clutch 40 that when closed drives the beveled gear 41 to actuate the beveled gear 42 on the shaft 37. This shaft is extended downward through the shaft housing 43 into a gear housing 44 below the body 15 and has at its lower end a relatively large fan propeller 45 that is arranged to drive air upwardly through the air inlet passage 26, as previously described.

In the gear housing 44 are arranged the bevel gears 46, 47 and 48 in mesh so that when the shaft 37 is actuated they drive the shafts 49 and 50.

The shaft 49 is extended forwardly and has a clutch 51 which when set causes the bevel gear 52 on shaft 49 to drive the beveled gear 53 on the fan shaft 54 that is mounted in a bracket 55 and has on its lower end a fan propeller 56 for drawing the air upward through the air passage 28 when the front wings 57 are in open position.

The shaft 50 is extended rearwardly and has the clutch 58 which, when closed, drives the beveled gears 59 to actuate the beveled gear 60 on the shaft 61 that has on its lower end the fan-shaped stabilizing propeller 62 that is arranged to draw air upwardly through the air passage 27 when the rear folding wings 63 are in open position.

Normally the pairs of folding wings 57 and 63 are held in closed position by the button 64 on the rods 65 that at one end are provided with pistons 66 in the air cylinders 67. The other ends of these rods 65 are extended through guides 68 and have the springs 69 arranged to engage the pins 70 and normally force the piston 66 toward the closed ends of cylinder 67. When compressed air is discharged into the cylinder 67 through the compressed air pipes 71 the pistons will be forced against the tension of the springs 69 and move the button 64 over recesses 72 in the wings 57—63.

The wings 57—63 are mounted on the hinges 73 that have their members pivotally connected by the rod 74 on which the springs 75 are also mounted and these springs are arranged to normally force the wings 57 and 63 into closed position. The hinges 73 can be in the form of piano hinges, as indicated in Figs. 1, 9 and 10 or strop hinges as shown in Figs. 11, 12 and 14.

When the buttons are moved as described over the recesses 72 compressed air discharges from the cylinders 67 through the ports 76 and is forced by the deflectors 77 over the folded wings to force them outwardly toward open position against the tension of the springs 75 where the pressure of the air will hold them until it is released. The pistons 66 are actuated by compressed air from the compartment 16.

Air from the compartment 16 passes through pipe 78 to the three-way valve 179 in the cock-pit 17m which valve is preferably constructed as shown in Fig. 4. When the valve is actuated it connects the passage of the pipe 78 with the pipe 79 so that compressed air through the branch pipes 80 and 81 is passed to the three-way pipe fittings 82 and 83 where the air is again split, part of it passing to the cylinders 67 through pipes 84 and 71, and the other part passing to the air cylinders 85—185 through pipes 86; and the air is exhausted through the pipe 279 by reverse movement of the valve.

The actuation of the valve 179 causes the pistons in the cylinders 67 to release the folded wings so they can be opened and also discharge compressed air over them as described. Also this valve causes cylinders 85 and 185 to actuate their pistons to close the clutches 51—58 to set the fan propellers 56 and 62 into action to hold the wings 57, 63 in open position against the tension of the springs 75 until the clutches are released; and also these propellers force air up into the chamber 25 and discharge it out through the spouts 31, 32 and 35 in the same manner as the propeller 45, the action of which has been described. The propellers 45, 56 and 62 are arranged to distribute the vertical lifting power at the center and ends of the aircraft.

I provide an air valve 116 that can be open to discharge a large volume of compressed air from the compartment 16 to aid the propellers 36, 45 and 62 in lifting the aircraft vertically at the start of a flight or to support it in the event it enters a pocket or field of rarefied air. I provide the compartment 16 with a safety valve 316, as seen in Fig. 6.

The detailed construction of the cylinders 85 and 185 is not shown, it being understood that when compressed air enters these cylinders they throw the lever 87 against the tension of the springs 88 to engage the clutches and it is assumed that when this action takes place the motor 38 is in action to drive the shafts 49 and 50 so that these propellers will be actuated as described.

It is also understood that during the flight of the aircraft the motor 38 is in operation to drive the large fan-like propeller 45 in the opening 26 to continuously discharge air upward through the passages 29 and 30 as described, and also that the helicopter propeller 36 on the upper end of the shaft 37 is driven to displace the air above the wings 33 and 34 so that in addition to causing the aircraft to rise vertically also aids the discharge of air under the stationary wings 33 and 34 to lift and stabilize the aircraft in flight.

Arranged at the inlet end of the air passages 29—30 are the trap doors 89—90 that are normally open and are hinged so they can be moved to a closed position, as diagrammatically indicated in Fig. 2. Also arranged adjacent the upper end of the passages 29 and 30 are the damper plates 91 and 92 on the rods 93 with the doors and plates arranged so they can be manipulated to equalize the discharge of air from the spouts 31—32 and 35 so that all or part of the air passing up through the chamber 25 can be discharged under either or both wings to lift and stabilize the aircraft.

The doors and damper plates can be operated in any well known manner, it being understood that such means is common in the art and for that reason is not shown in complete detail. However, in Fig. 13 the control of the damper plates is semidiagrammatically indicated and as seen therein the damper rods 93 are provided with levers 94 and 95 that are connected to their respective air cylinders 96—97 by their respective links 98 and piston rods 99. The rods 99 are connected to their respective pistons 100 so that when compressed air is injected into these cylinders through pipes 101 the pistons will be moved toward the other end of their respective cylinders to thereby actuate the damper plates 91 and 92.

Preferably there is a four-way valve 102 for each of the cylinders 96 and 97, one of which is semidiagrammatically shown in Fig. 3. As seen therein, compressed air is supplied to the valve through a pipe 103 so it can be connected to either of the pipes 101 or 104 and exhaust the air through the ports 105. The construction and operation of four-way valves to operate pistons are old in the art and for the sake of brevity are not shown or described in complete detail.

The wings 57 and 63 have end curtains 157 and 163 that are spread when the wings are opened to hold the air from discharging outwardly at the ends of the wings, and these curtains fold when the wings are folded, as diagrammatically indicated in Figs. 10, 11 and 12.

Preferably the shafts 37, 39, 49, 50, 54 and 61 are mounted in suitable ball bearings in a manner similar to the mounting of the shaft 61 shown in detail in Fig. 12, and as seen therein the hollow shaft 61 is supported in the ball bearings 106.

Also it is understood that the shell 24 is suitably secured to the body 15 by the usual straps and braces 107 and 108, as indicated in Figs. 11 and 12. These braces are not shown in the other figures to avoid a confusion of lines.

It is also understood that the fixed wings 33, 34 are constructed in the usual way and if desired can be provided with the hinged fins 133 that have the post levers 134 that can be actuated in the usual way.

Preferably the fixed wings are mounted above the shell 24 supported by braces 109 that are fixed in the usual way. Also I provide a ladder 110 that aids in securing the wings to the shell and provides a means for easily reaching the propeller 36 if it needs adjusting or repair. Also the propeller 36 can be reached through the trap door 111 that is diagrammatically shown as closing the man-hole 112 in Fig. 5.

Also if desired the motor 38 can be connected to an air compressor 113 that is indicated diagrammatically in Fig. 6 to keep the air compartment 16 fully charged. I also provide a compressed air cylinder 216 in the front end of the aircraft that can be connected to the compressor. It is understood, of course, that the air compressor as well as an electric generator can be arranged in the store room 20, as indicated diagrammatically by dotted lines and numbered 114 and 115.

The aircraft is provided with the usual tail-group 120 for guiding it in flight and also the usual wheel carriage 121 for landing.

In operation the helicopter-aircraft can be placed in flight by driving it over a runway by the engine 22 and propeller 23, in which instance it is aided in ascending by the helicopter propellers. Or if desired, the engine 22 can be idle and the helicopter propellers utilized to lift the aircraft vertically, in which movement, of course, the full lifting power of all the propellers 36, 45, 56, are driven.

After the aircraft has reached a suitable elevation the engine 22 and propeller 23 can be used to move it horizontally and its course is steered by the tail group 120.

The aircraft can be landed in the usual way or if desired it can descend in a vertical course by opening the folded wings 57, 63 and actuating the propellers 36, 45, 56 and 62 so that the aircraft will float downward in a manner similar to a landing parachute.

In the event the aircraft enters a pocket or field of rarefied air the air valve 116 can be open to release the large volume of compressed air from the compartment 16 so it will aid the propellers 36, 45 and 62 in supporting the aircraft, as previously indicated.

I claim as my invention:

1. A helicopter-aircraft including a body with means for raising and propelling said body through the air, a shell forming an air chamber around said body, folding wings pivotally connected to said shell that are normally in position to close an air passage into said air chamber, a stabilizing propeller in said air passage that is arranged to be enclosed by said wings and normally idle, and means including compressed air cylinders for opening said folded wings and also actuating a clutch so that said propeller will be driven to aid in stabilizing said aircraft when in flight.

2. A helicopter-aircraft including a body having a compressed air compartment therein; a shell forming an air chamber around said body and having an air passage into said chamber, a propeller arranged in said passage that is normally idle, wings pivotally connected to said shell that in closed position cover said air passage, and means for opening said wings to uncover said air passage and actuate said propeller to drive air through said passage into said air chamber to stabilize said aircraft when in flight.

3. A helicopter-aircraft including a body having a compressed air compartment therein, a shell forming an air chamber around said body and having an air passage into said chamber, a propeller arranged in said passage that is normally idle, wings pivotally connected to said shell that in a closed position cover said air passage, a motor, and means for utilizing compressed air from said compartment to open said wings and establish a driving connection between said propeller and motor.

4. A helicopter-aircraft including a body having a compressed air compartment therein, a shell forming an air chamber around said body and having an air passage into said chamber, a propeller arranged in said passage that is normally idle, a motor, a driving connection between said motor and propeller having a clutch therein that is normally open, and means for utilizing the compressed air from said compartment to open said wings and shift said clutch so that said propeller will force the outer air into said air chamber to stabilize said aircraft.

5. A helicopter-aircraft including a body having a compressed air compartment therein, a shell forming an air chamber around said body and having an air passage into said chamber that is normally idle, a motor, a driving connection between said motor and propeller having a clutch therein that is normally open, fixed wings secured to said shell, discharge spouts arranged under said wings that are in communication with said air chamber, and means for utilizing the compressed air from said compartment to open said wings and shift said clutch so that said propeller will force the outer air into said air chamber and out through said spouts to aid in lifting and stabilizing said aircraft.

6. The combination set forth in claim 5 and other means for controlling the discharge of air from said spouts so that all or part of the air can be discharged under either wing or equalize between them to stabilize said aircraft.

7. A helicopter-aircraft including a body, a shell forming an air chamber around said body and having an open air passage through the bottom thereof, a fan propeller arranged in the air passage through said shell, side spouts in the top of said shell, and means for driving said fan propeller to circulate air through said shell and out of said side spouts for the purpose specified.

8. The combination set forth in claim 7 with, and fixed wings secured to said shell above said side spouts, and means for controlling the discharge of air through said side spouts.

9. The combination set forth in claim 7 with, and fixed wings secured to said shell above said side spouts, a center spout extended from said shell to a discharging position above said wings, and a propeller for displacing the air above said center spout.

10. The combination set forth in claim 7, with, and other air passages through the bottom of said shell, folding wings pivotally connected to said shell for normally closing the other air passages, and automatic means for opening said wings to uncover said other air passages.

11. A helicopter aircraft including a body, a shell forming an air chamber around said body and having an open air passage through the bottom thereof, a fan propeller arranged in the air passage through said shell, a shaft on which said propeller is mounted, a motor for driving said shaft, fixed wings secured above said shell, side spouts for discharging air under said wings when said propeller is driven, other air passages through the bottom of said shell, folding wings for normally closing said other air passages, other fan propellers arranged in said other air passages that are normally idle, and compressed air means for opening said folded wings and driving said other fan propellers.

12. The combination set forth in claim 11, with means for controlling the discharge of air from said side spouts so that all of the air can be discharged under either wing or equalized between them to stabilize the aircraft.

13. A helicopter-aircraft including a body having a compressed air compartment therein, a shell forming an air chamber around said body, an air passage through the bottom of said shell, folding wings pivotally mounted on said shell that normally close said air passage, a compressed air cylinder, a piston therein having a rod that normally secures said wings in closed position, a valve for releasing compressed air from said compartment to move said piston to release said wings and discharge compressed air into said chamber to aid in moving said wings to an open position.

14. The combination set forth in claim 13 with a propeller in the air passage normally closed by said wings that is normally idle, and means for driving said propeller to hold said wings in an open position and drive air into said chamber for the purpose specified.

In witness whereof I have hereunto affixed my signature.

CHRISTOPHER C. HOLMES.